(12) United States Patent
Qi et al.

(10) Patent No.: US 7,142,671 B2
(45) Date of Patent: Nov. 28, 2006

(54) METHODS AND APPARATUS FOR IMPLEMENTING A CRYPTOGRAPHY ENGINE

(75) Inventors: Zheng Qi, Milpitas, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 728 days.

(21) Appl. No.: 09/892,240

(22) Filed: Jun. 26, 2001

(65) Prior Publication Data

US 2002/0106078 A1 Aug. 8, 2002

Related U.S. Application Data

(60) Provisional application No. 60/255,562, filed on Dec. 13, 2000.

(51) Int. Cl.
*H04K 1/00* (2006.01)

(52) U.S. Cl. .................... 380/29; 380/28; 380/30; 380/36; 380/37

(58) Field of Classification Search ............. 380/29, 380/36–37, 42, 259, 264–265, 268, 278–286, 380/44–47
See application file for complete search history.

(56) References Cited

U.S. PATENT DOCUMENTS

| | | | |
|---|---|---|---|
| 4,107,469 A | 8/1978 | Jenkins | |
| 4,221,474 A | 9/1980 | Lermann et al. | |
| 4,255,811 A | 3/1981 | Adler | |
| 5,001,753 A | 3/1991 | Davio et al. | |
| 5,365,588 A | 11/1994 | Bianco et al. | |
| 5,469,547 A * | 11/1995 | Pawlowski | 713/600 |
| 5,661,807 A * | 8/1997 | Guski et al. | 713/159 |
| 5,671,284 A * | 9/1997 | Buer | 380/29 |
| 5,825,886 A | 10/1998 | Adams et al. | |
| 6,138,132 A | 10/2000 | Lee et al. | |
| 6,236,686 B1 | 5/2001 | Kamishima | |
| 6,272,221 B1 | 8/2001 | Tsunoo | |
| 6,320,964 B1 * | 11/2001 | Callum | 380/29 |
| 6,424,713 B1 | 7/2002 | Sprunk | |
| 6,567,943 B1 | 5/2003 | Barnhart et al. | |
| 6,578,150 B1 * | 6/2003 | Luyster | 713/200 |
| 6,591,349 B1 * | 7/2003 | Steinman et al. | 711/154 |
| 6,760,439 B1 * | 7/2004 | Windirsch | 380/37 |
| 6,769,063 B1 * | 7/2004 | Kanda et al. | 713/193 |
| 6,792,536 B1 | 9/2004 | Teppler | |
| 2001/0011251 A1 * | 8/2001 | Sugahara et al. | 705/51 |

(Continued)

FOREIGN PATENT DOCUMENTS

EP 0 661 843 A2 7/1995

(Continued)

OTHER PUBLICATIONS

M. Morris Mano, "Digital Design Second Edition", Prentice-Hall Inc, p. 173-175.*

(Continued)

*Primary Examiner*—Kim Vu
*Assistant Examiner*—Ponnoreay Pich
(74) *Attorney, Agent, or Firm*—Sterne Kessler Goldstein & Fox P.L.L.C.

(57) ABSTRACT

Methods and apparatus are provided for implementing a cryptography engine for cryptography processing. A variety of techniques are described. A cryptography engine such as a DES engine can be decoupled from surrounding logic by using asynchronous buffers. Bit-sliced design can be implemented by moving expansion and permutation logic out of the timing critical data path. An XOR function can be decomposed into functions that can be implemented more efficiently. A two-level multiplexer can be used to preserve a clock cycle during cryptography processing. Key scheduling can be pipelined to allow efficient round key generation.

30 Claims, 8 Drawing Sheets

U.S. PATENT DOCUMENTS

| | | |
|---|---|---|
| 2002/0034295 A1 | 3/2002 | Den Boer |
| 2002/0106078 A1 | 8/2002 | Qi et al. |

FOREIGN PATENT DOCUMENTS

| | | |
|---|---|---|
| EP | 0 661 843 A3 | 7/1995 |

OTHER PUBLICATIONS

Zheng Qi and Mark Buer, "Methods and Apparatus For Implementing a Cryptography Engine", U.S. Appl. No. 09/892,310, filed Jun. 26, 2001, 39 pages.

Zheng Qi and Mark Buer, "Methods and Apparatus For Implementing a Crytography Engine", U.S. Appl. No. 09/892,242, filed Jun. 26, 2001, 35 pages.

Bruce Schneier, *Applied Cryptography, Protocols, Algorithms, and Source Code in C*, Chapter 12, " Data Encryption Standard (DES)", 1996.

Jenkins, J.O.M; *IC multiplexer increases analogue switching speeds*; Electronic Engineering, Morgan-Grampian Ltd., London, vol. 45, No. 540; Feb. 1973, pp. 73-75; XP000807191; ISSN: 0013-4902.

McLoone et al.; *A High performance FPGA implementation of DES*; 2000 IEEE Workshop on Signal Processing Systems, SIPS 2000. Design and Implementation (CAT. No. 00TH8528), Lafayette, LA, 11-13; Oct. 2000, pp. 374-383; XP002251022; ISBN: 0-7803-6488-0.

European Search dated Sep. 4, 2003, cited in corresponding European Patent No. 01309322.4-1525 filed Nov. 2, 2001.

Schneier, Bruce; *Applied Cryptography Second Edition*; 1996, John Wiley & Sons, Inc. U.S. XP002251024; p. 349.

Schneier, Bruce; Applied Cryptography Second Edition; 1996, John Wiley & Sons, Inc. U.S. XP002251024; p. 265-301.

\* cited by examiner

METHODS AND APPARATUS FOR IMPLEMENTING A CRYPTOGRAPHY ENGINE

CROSS REFERENCE TO RELATED APPLICATIONS

This application claims priority under U.S.C. 119(e) from U.S. Provisional Application No. 60/255,562, entitled "High Speed DES Engine" as of filing on Dec. 13, 2000, the disclosure of which is herein incorporated by reference for all purposes.

BACKGROUND OF THE INVENTION

1. Field of the Invention

The present invention relates to implementing a cryptography engine. More specifically, the present invention relates to methods and apparatus for efficient performance of a cryptography algorithm such as a DES algorithm.

2. Description of Related Art

Conventional software and hardware designs for implementing various cryptography algorithms including the DES and the triple DES algorithms have significant performance limitations. Many designs for performing cryptography processing are well known in the art and are discussed, for example, in Applied Cryptography, Bruce Schneier, John Wiley & Sons, Inc. (ISBN 0471128457), incorporated by reference in its entirety for all purposes. In order to improve the speed of cryptography processing, specialized cryptography accelerators have been developed that typically outperform similar software implementations. Examples of such cryptography accelerators include the BCM™ 5805 manufactured by Broadcom, Inc. of San Jose, Calif.

Although specialized hardware cryptography accelerators can often outperform software written to perform the same tasks, conventional hardware cryptography accelerators have significant performance bottlenecks for implementing cryptography algorithms including the DES and the triple DES algorithms. Some performance bottlenecks include limitations related to key scheduling, clock rate, clock synchronization, and core logic operations.

It is therefore desirable to provide methods and apparatus for improving the implementation of cryptography algorithms with respect to some or all of the performance limitations noted above.

SUMMARY OF THE INVENTION

Methods and apparatus are provided for implementing a cryptography engine for cryptography processing. A variety of techniques are described. A cryptography engine such as a DES engine can be decoupled from surrounding logic by using asynchronous buffers. Bit-sliced design can be implemented by moving expansion and permutation logic out of the timing critical data path. An XOR function can be decomposed into functions that can be implemented more efficiently. A two-level multiplexer can be used to preserve a clock cycle during cryptography processing. Key scheduling can be pipelined to allow efficient round key generation.

In one embodiment, a cryptography engine for performing cryptographic operations on a data block is provided. The cryptography engine includes a key scheduler configured to provide keys for cryptographic operations, a two-level multiplexer, expansion logic, and permutation logic. The expansion logic is coupled to the input stage of the multiplexer circuitry. The expansion logic is configured to expand a first bit sequence having a first size to an expanded first bit sequence having a second size greater than the first size. The first bit sequence corresponds to a portion of the data block. The permutation logic is coupled to the expansion logic. The permutation logic is configured to alter a second bit sequence corresponding to the portion of the data block, whereby altering the second bit sequence performs cryptographic operations on the data block.

The cryptography engine can also include an Sbox configured to alter a third bit sequence corresponding to the portion of the data block by compacting the size of the third bit sequence and altering the third bit sequence using Sbox logic. In one embodiment, the cryptography engine is a DES engine. The cryptography engine can have two 2-to-1 multiplexers on the first level coupled to two 2-to-1 multiplexers on the second level. The two-level multiplexer can be configured to select either initial data, swapped data, or non-swapped data to provide to the output stage of the multiplexer.

According to another embodiment, an integrated circuit layout associated with a cryptography engine for performing cryptographic operations on a data block is provided. The integrated circuit layout can provide information for configuring the cryptography engine. The integrated circuit layout includes a key scheduler configured to provide keys for cryptographic operations, a two-level multiplexer, expansion logic and permutation logic. The expansion logic is coupled to the input stage of the multiplexer circuitry and is configured to expand a first bit sequence having a first size to an expanded first bit sequence having a second size greater than the first size. The first bit sequence corresponds to a portion of the data block. The permutation logic is coupled to the expansion logic. The permutation logic is configured to alter a second bit sequence corresponding to the portion of the data block, whereby altering the second bit sequence performs cryptographic operations on the data block.

According to other embodiments, a cryptography engine for performing cryptography operations on a plurality of packets is provided. The packets can have payloads and payload gaps. The cryptography engine includes a DES engine, an asynchronous input buffer coupled to the cryptography engine input; and surrounding logic coupled to the DES engine through the asynchronous input buffer, wherein the DES engine operates at a first clock rate and the surrounding logic operates at a second clock rate different from the first clock rate.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings.

DETAILED DESCRIPTION OF SPECIFIC EMBODIMENTS

Figure 1:
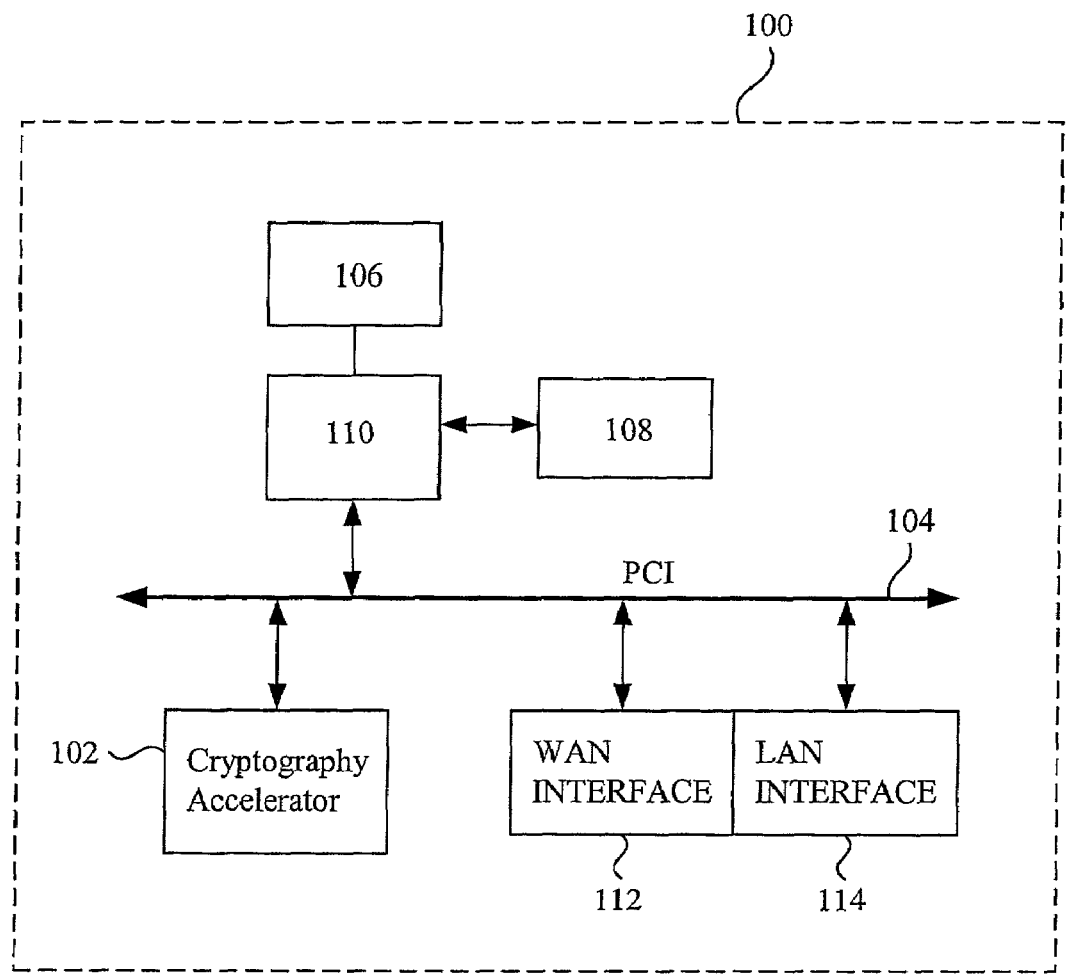
FIG. 1 is a diagrammatic representation of a system that can use the techniques of the present invention in accordance with one embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Techniques are provided for enabling the implementation of efficient cryptographic processing, such as DES and triple DES processing. DES specifies encrypting individual 64-bit data blocks. A 64-bit data block of unencrypted data is provided to the DES engine, combined with a key, and output as a 64-bit data block of encrypted data. The key used for DES processing is typically a 56-bit number, although the key can be expressed as a 64-bit number. DES describes breaking up a 64-bit block of data into a right half and a left half, each 32-bits long. As will be appreciated by one of skill in the art, sixteen rounds of cryptographic operations are then performed. In each round, operations on the right half of the data include expansion, permutation, Sbox operations, and combination with a round key. A round key can be determined based on the round number of DES processing is referred to herein as a round key. The round key can be derived by applying permutation and shift functions to all 56 bits of the original key. The round number of DES determines the shift amount.

An XOR function is used to combine the right half of the data with a version of the key based on the round. The result can then be combined with the left half also by way of an XOR function. The unprocessed right half of the data becomes the left half of the data for the next round. Triple DES specifies performing three 16 round DES operations consecutively using three different keys. Typical hardware implementations for DES or triple DES perform one round calculation per clock cycle. The performance of DES or triple DES engine is therefore determined by the clock rate.

However, a variety of hardware design constraints have traditionally limited the clock rate of cryptographic processing engines.

One design constraint that has traditionally limited the clock rate of cryptographic processing engines is the clock rate of circuitry surrounding the cryptographic processing unit. Surrounding logic having a slower clock rate than the DES engine is typically unable to provide data at a sufficient rate for DES processing. Methods and apparatus are described for decoupling the DES engine and the surrounding logic. The decoupled DES engine and surrounding logic allow flexibility in setting different clock ratios. The flexibility allows the DES engine to be designed to operate at a much higher clock rate than the surrounding logic.

Other design constraints relate to resistance capacitance (RC) delay. As will be appreciated by one of skill in the art, RC delay is a significant limitation in the performance of high-speed logic chips. RC delay in high speed circuit design can result from the resistance of interconnections and the capacitance associated with the dielectric media. RC delay is especially pronounced in sub 0.18 micron technologies. One way of limiting the effects of RC delay is to use bit-sliced design. That is, data paths are made narrower to allow more efficient custom-designs and layouts. In one example, the 32-bit data paths used in DES cryptography processing would be split into eight 4-bit data paths using efficiently designed layouts. Bit-sliced design, however, can not be used in conventional DES cryptography processing because the 32-bit data paths include expansion and permutation operations. The 32-bit blocks in the data paths are typically expanded, combined with a key, provided to an Sbox, and permuted. Bit-sliced design cannot be used because the bits in the 32-bit data blocks are intermingled. In other words, the bits in one four bit-slice would typically be swapped with bits from other four bit-slices because the bits are periodically permuted. Because there is no easy mechanism for keeping track of the bit swapping, bit-sliced design can not easily be implemented. Techniques are described for moving the permutation and expansion operations out of the 32-bit data path used in DES cryptography processing. By moving the permutation and expansion operations out of the data path, bit-sliced implementation can be used to limit the effects of RC delay in the time critical DES processing data path.

DES also describes the use of XOR operations in cryptography processing. As will be appreciated by one of skill in the art, XOR operations are computationally expensive. Techniques are provided for using more fundamental operations to replace XOR operations in the data path.

As noted above, the DES algorithm specifies sixteen rounds of processing. Triple DES performs the DES algorithm three consecutive times. During each round of DES processing, the left and right halves of the 64-bit data are swapped. However, in triple DES, the left and right halves of the 64-bit data are not swapped during the transitions between the consecutive performance of 16 round DES operations. To allow non-swapping of the left and right halves, logic that takes an extra clock cycle and a 3-to-1 multiplexer is typically used. Techniques using a two level 2-to-1 multiplexer are provided that do not take a extra clock cycle during the transitions between the sixteen rounds of DES processing. As will be appreciated by one of skill in the art, 2-to-1 multiplexers can be integrated together with registers.

The present invention also contemplates pipelined key scheduling to allow a round key to be provided to each DES round at a high clock rate. The key generation, selection, provision, and consumption operations can be separated into different stages for pipelined processing.

The techniques of the present invention can be implemented in a variety of contexts. FIG. 1 describes the present invention in terms of a cryptographic accelerator system that can be implemented in a number of ways, such as for example, as a stand alone integrated circuit, as embedded software, or as a subsystem included in, for example, a server computer used in a variety of Internet and Internet related activities. It should be noted, however, that the invention is not limited to the described embodiments and can be used in any system where data encryption is desired.

FIG. 1 is a diagrammatic representation of one example of a cryptographic processing system 100 in accordance with an embodiment of the invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit or CPU of a system 100, it does not necessarily have to be the CPU. It can be one of a variety of processors. A LAN interface 114 couples the processing system 100 to a local area network (LAN) and receives packets for processing and writes out processed packets to the LAN (not shown). Likewise, a Wide Area Network (WAN) interface 112 connects the processing system to a WAN (not shown) such as the Internet, and manages in-bound and out-bound packets, providing automatic security processing for IP packets.

A cryptography accelerator 102 can perform many cryptography algorithms including the DES and the triple DES algorithms. It should be noted that although the techniques of the present invention will be described in the context of DES and triple DES for clarity, one of skill in the art will appreciate that the techniques can also apply to other cryptography algorithms including variations to the DES and triple DES algorithms.

Figure 2:
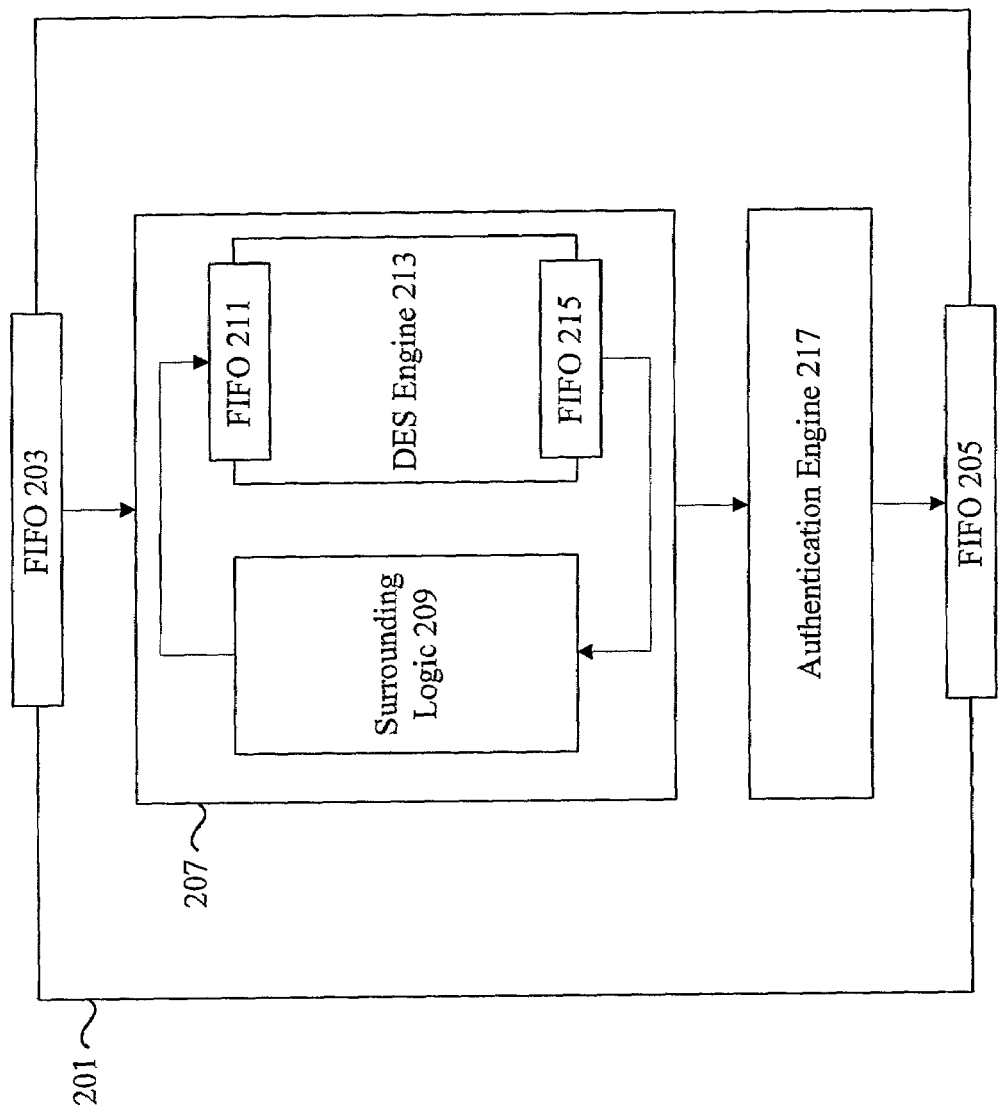
FIG. 2 is a diagrammatic representation of a cryptography engine having surrounding logic and a DES engine in accordance with one embodiment of the present invention.

FIG. 2 is a diagrammatic representation of a cryptographic processing unit in accordance with one embodiment of the present invention. The cryptographic processing unit 201 has input and output buffers 203 and 205. The input and output buffers 203 and 205 may be coupled to an external processor as shown in FIG. 1. The cryptographic processing unit 201 contains a cryptography engine 207. The cryptographic processing unit 201 can also contain an authentication engine 217. As will be appreciated by one of skill in the art, other components including decoding logic may also be components in the cryptographic processing unit 201. The cryptography engine 207 contains surrounding logic 209 and DES engine 213. DES engine 213 can include asynchronous FIFO interfaces 211 and 215. The asynchronous FIFO interfaces 211 and 215 allow DES engine 203 to operate at a much higher clock rate than the surrounding logic 209. The asynchronous FIFO interface 211 also can be used to convert 32-bit blocks received from the surrounding logic 209 to 64-bit blocks for DES processing. The asynchronous FIFO interfaces 215 similarly he can be used to convert the 64-bit blocks for DES processing back to 32-bit blocks for the surrounding logic 209.

The asynchronous FIFO interfaces 211 and 215 are provided to decouple the operations of the surrounding logic 209 in the DES engine 213. The surrounding logic 209 can parse the data to allow processing of portions of the data by the DES engine 213. The DES engine 213 can process a data block whenever it is available at the input FIFO. The FIFO interfaces 211 and 215 compensate for the rate mismatch between the surrounding logic 209 and the DES engine 213. The asynchronous FIFO interfaces provide flexibility for setting different clock ratios between DES engine 213 and surrounding logic 209 and allow reuse of the same DES engine 213 design in other processor configurations. In one example, the clock ratio between the DES engine 213 and the surrounding logic 209 is 3 to 1. In this example, the DES engine can operate at about 500 MHz while the surrounding logic can operate at about 166 MHz. The FIFO interface can be sized to provide sufficient data for the DES engine to process. The clock rate of the surrounding logic 209 as well as the latency to load and unload data for the DES engine 213 can be considered. In one example, the input FIFO 211 must be large enough to continually provide DES engine 213 with data. Each data block the surrounding logic processes can contain data that the DES engine 213 processes.

While this embodiment of the invention is described with respect to a DES engine, the invention may be applied more generally to other cryptography engines such as AES.

Figure 3:
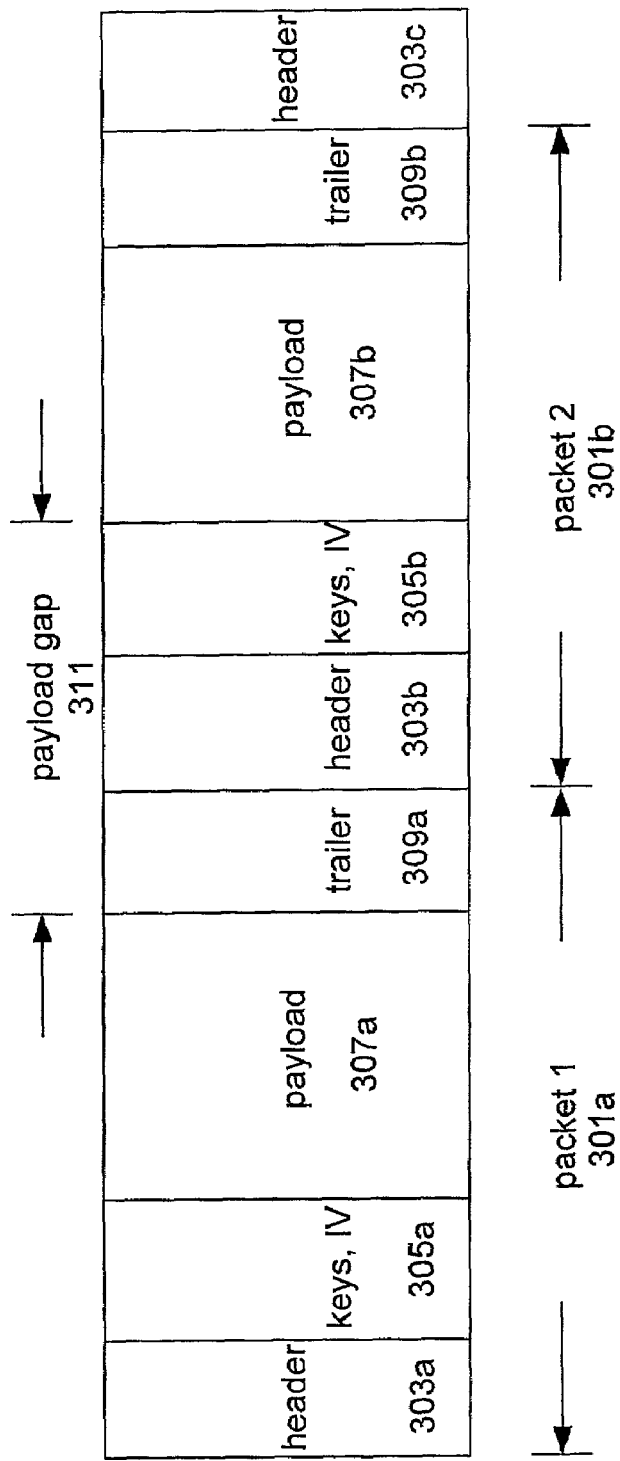
FIG. 3 is a diagrammatic representation of a packet that the DES engine may receive in accordance with one embodiment of the present invention.

FIG. 3 is a diagrammatic representation of data packets that the surrounding logic 209 may send to cryptography engine 207 by way of the FIFO interface 203 in accordance with one embodiment of the present invention. Packet 301 contains a header portion 303. Portion 305 contains keys and an initialization vector. Initialization vectors (IV) are described in RFC 2405 titled The ESP DES-CBC Cipher Algorithm With Explicit IV, the entirety of which is incorporated by reference for all purposes. 'CBC' stands for cipher block chaining mode. This mode specifies that the cryptographic processing of 64-bit data blocks should be chained together in a way such that the result of last 64-bit data becomes the IV for processing the block follows. CBC mode can prevent a data block from being processed in parallel in many conventional systems.

Portion 307 contains the payload. The payload is the portion of packet 301 that is provided to DES engine 213 for DES processing. The payload 307 can be followed by a trailer 309. The payload header 303, keys and initialization vector portion 305, and trailer 309 constitute the payload gap 311 associated with the data from surrounding logic 209. Data in the payload portion of the packet can be continually provided to the DES engine 213 by determining the payload gap 311 and the clock rate of the surrounding logic 209.

As noted above, the DES engine 213 may be processing at 500 MHz while the surrounding logic 209 may only be able to provide data to DES engine 213 at a rate of about 166 MHz. The FIFO interface 211 can comprise registers also clocked at 166 MHz. Assuming that a single 32-bit word is bypassed every 166 MHz clock cycle, it would take 50 clock cycles at 166 MHz to bypass a payload gap 311 of 50 words. According to various embodiments, it takes 50 clock cycles to process a 64-bit block at 500 MHz. The 50 clock cycles at 500 MHz correspond to approximately 17 clock cycles at 166 MHz. The FIFO interface 211 would be configured to be large enough to hold at least four 32-bit blocks. That is, 64-bits of payload can be available in the FIFO interface 211 before DES engine 213 completes processing of a single 64-bit block. In one embodiment, the FIFO is sized to hold eight 32-bit blocks. Two 32-bit words are used to hold data between packets so that the DES engine knows the end of one payload. Therefore, six blocks are available for payload. In some implementations, the payload gap can exceed 50 words. Gaps can include the following entries: MCW (1

32-bit word), Host Context (4 words), SA data (keys, 18 words), Buffer Descriptor (3 words), Ipv4 header and options (15 words), ESP header (IV, 4 words), ESP trailer (3 words), Status trailer (4 words), and a variable length Ethernet header and trailer.

Figure 4A:
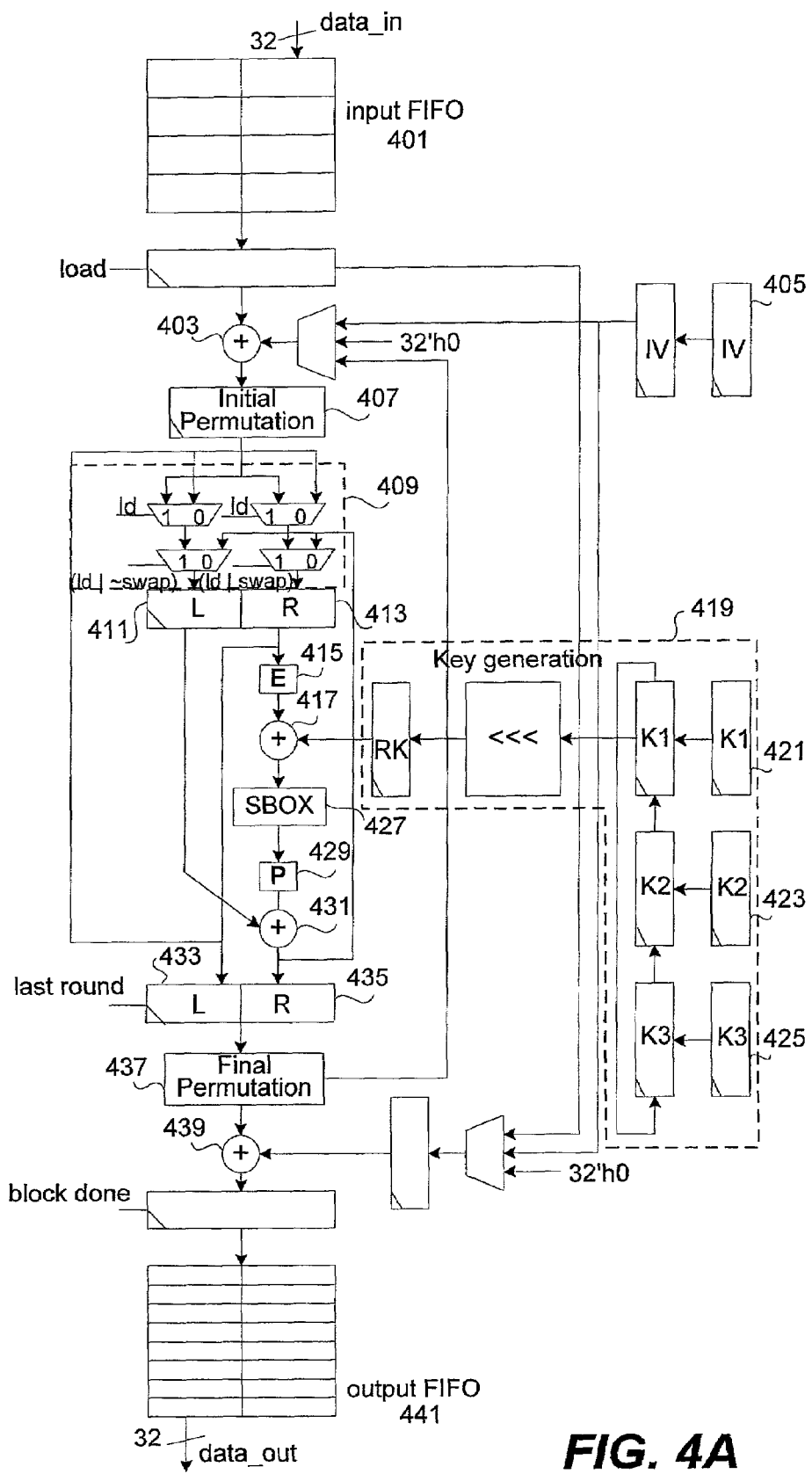
FIG. 4A is diagrammatic representation of a DES engine 213 as shown in FIG. 2.

FIG. 4a is a diagrammatic representation of a DES engine 213 as shown in FIG. 2. The DES engine can include an input FIFO 401. The input FIFO 401 can be asynchronous to decouple the DES engine from surrounding logic. A 64-bit data block is combined with an initialization vector from initialization vector block 405. Initialization vectors are described in RFC 2405 as noted above. The 64-bit block then undergoes an initial permutation at 407. The initial permutation occurs before round 1. It should be noted that in some variations to DES, to which the present invention is applicable, initial permutation and final permutation operations are not performed. The 64-bit block is then passed to two-level multiplexer stage 409. Two-level multiplexer stage 409 contains four multiplexers for determining whether to load initial data, swap data from the previous round, or not swap data from the previous round. Initial data is loaded in the first round of DES processing. Data is swapped between rounds of DES processing. Data is not swapped in triple DES between the completed 16 rounds of DES processing. Control logic (not shown) can track the round number in order to determine what signals to send to the multiplexers. The first level multiplexers are sent a signal to load or not to load data from a previous round or to allow initial data to pass through after initial permutation 407.

The second level multiplexers are provided a control signal instructing the multiplexers to swap or not swap the feedback data or load the initial data. The initial data is never swapped. The control signal can be the load value provided in the first level combined by a bitwise OR with the swap value in the right half and combined with the one's complement of the swap value in the left half. In a four-bit data path example, the load value is 1 and the swap value is 0. It should be noted that the control signals can be a variety of numbers including a sequence of ones or a sequences of zeros. In the case of loading initial data, initial data is loaded into the first level of multiplexers and provided to the second level of multiplexers. It can pass the second level of multiplexers if the load value is 1. According to various embodiments, the load value of 1 combined with a bitwise OR with the swap value of 0 is 1. The load value of 1 combined with a bitwise OR with the swap value of 1 is also 1. In the case of load feedback data, the load value is 0. The feedback data is swapped according to the value of signal swap. Registers 411 and 413 receive the initial data or the feedback data.

After the first round of processing, the load value is switched to 0. The swap value is now 1 to indicate that the left and right halves should be switched. Data is passed back along line 453 to the first level of multiplexers 409. Since the load value is 0, the data passed back along line 453 is selected and provided to the second level of multiplexers. The (1d|~swap) value for the multiplexer corresponding to register 411 is (0|0) so the right half passed back along line 451 is selected and provided to register 411. The (1d|~swap) value for the multiplexer corresponding to register 413 is (0|1) so the data provided from the first level multiplexer corresponding to data from line 453 is sent to register 413.

One benefit of the two level multiplexers is that the timing critical 32-bit data is arranged to go through only the second level multiplexer, which can be combined with the registers 411 and 413 to minimize the delay.

As will be appreciated by one of skill in the art, various control signals may be used. An alternative approach would be to use a 3-to-1 single level multiplexer to select either the initial data, the swapped feedback data, or the non-swapped feedback data. The use of 3-to-1 single level multiplexer however adds significant delay to the timing critical datapath because the 3-to-1 multiplexer can not be easily combined with the registers. The 3-to-1 multiplexer uses an extra clock cycle. According to a preferred embodiment, four 2-to-1 multiplexers are used. The 2-to-1 multiplexers in the second level of the multiplexer stage 409 can be integrated with the registers 411 and 413. Register 411 contains the last half of this initial 64-bit block in round 1. Registers 411 and 413 both typically hold 32-bits of data. The 32-bit data block contained in register 413 is provided to both expansion stage 415 and to register 411 through multiplexer stage 409 for the next round. Control signals in multiplexer stage 409 are configured to provide the 32-bit data block contained in register 413 to register 411 in the next round of DES processing. The 32-bit data block is provided to expansion logic 415.

As will be appreciated by one of skill in the art, the expansion logic 415 changes the order of the bits in the 32-bit at block and also repeats certain bits. The expansion logic 415 uses the 32-bit block to generate a 48-bit block. The expansion logic improves the effectiveness of the encryption process and also makes the 32-bit block into a 48-bit block that corresponds to the size of the key. The 48-bit block can then be combined with an XOR with the 48-bit round key at 417.

Keys are provided by key generation logic or key scheduler circuitry 419. A version of the key for cryptography processing of the original 64-bit block is provided by key scheduler 419. Key scheduler 419 can provide a different version of the original key for every round by applying permutation and shift functions to all 56 bits of the original key. The 48-bit block resulting from the XOR at 417 is provided to Sbox stage 427. As will be appreciated by one of skill the art, each Sbox in Sbox stage 427 converts a six-bit input into a four-bit output. According to various embodiments eight Sboxes are provided in Sbox stage 427. Sboxes as well as other cryptography operations are described in Applied Cryptography, Bruce Schneier (ISBN 0471128457), the entirety of which is incorporated by reference for all purposes.

The 32-bit output of Sbox stage 427 is provided to permutation stage 429. A permutation stage 429 maps input bits in certain positions to different output positions. In one example, bit 1 is moved to position 16 of the output, bit 2 is moved to position 7 of the output, and bit 3 is moved to position 20 of the output, etc. The 32-bit output of permutation stage 429 is combined with an XOR with the value in register 411 at 431. The result of the XOR is provided to the register 411 through multiplexer stage 409 for the next round of DES processing. The same process occurs for the subsequent rounds of DES processing. That is, the right half is expanded, combined with an XOR function with a version of the key, provided to an Sbox stage, permuted, and combined with an XOR with the left half. After the last round, the outputs are written to register 433 and register 435. The output can then undergo a final permutation at 437. The result of a final permutation at 437 is combined by way of an XOR with an initialization vector as noted above when the DES engine is used to decrypt data. Otherwise, the result of the final permutation at 437 can remain unchanged by combining by way of an XOR with a sequence of zeros.

For triple DES, the outputs at 433 and 435 are passed back to multiplexer stage 409. Control circuitry determines how to pass the data back to register 411 and 413 for a next 16 rounds of DES processing. In typical implementations, an extra clock cycle is required to determine whether to swap the left and right halves or not to swap the left and right halves. According to the techniques of the present invention, however, two-level multiplexer stage 409 avoids the extra clock cycle. Data can be fed back to multiplexer stage 409 as if it were another round of DES processing. Control logic, allows the proper determination of how to load the data based on whether it is another DES round or a transition before another 16 round DES algorithm. More specifically, the swap value can be 0 for transitions. The processed data resulting from the DES or triple DES algorithm is provided to output FIFO 441. Output FIFO 441 can be asynchronous FIFO like input FIFO 401.

Figure 4B:
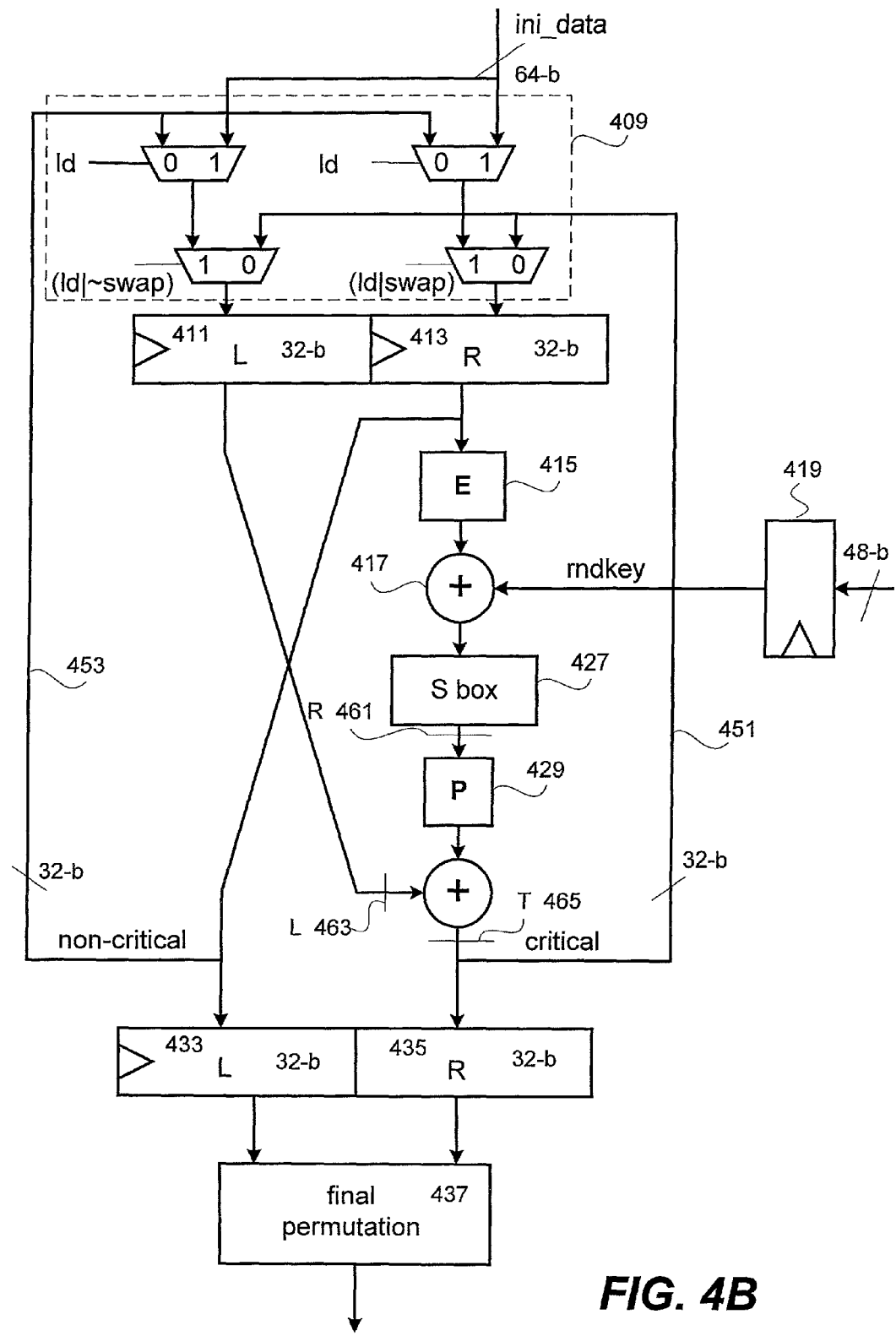
FIG. 4B is a diagrammatic representation of a DES engine in accordance with one embodiment of the present invention.

FIG. 4b is a diagrammatic representation of a DES engine in accordance with one embodiment of the present invention showing critical and non-critical paths in the round processing logic. A block of 64-bit data is input through multiplexer stage 409 into left register 411 and right register 413. The 32-bit data in right register 413 is provided to left register 411 for the next round of DES processing and to expansion block 415 as noted above in FIG. 4a. The 48-bit output is combined using an XOR function with the round key stored in the key register 419 at 417. The 48-bit data block is then provided to Sbox stage 427 and permuted at 429. The logic operations performed such as XOR 417 and Sbox 427 on the right half data path are resource intensive and make path 451 a timing critical path. The timing critical path 451 can be implemented using bit-sliced design. Path 453 simply feeds the right half data back to the first level multiplexer. Path 453 contains less logic than path 451 and is therefore referred to as a non-critical path.

As noted above, bit-sliced implementation cannot be performed because the permutation 429 and expansion logic 415 change the order of bits in the 32-bit data block. It would be difficult to split a 32-bit data path into eight separate four bit slices or a 48-bit data path into eight separate six bit slices because the bits in the timing critical data path are intermingled by the expansion and permutation logic. The techniques of the present invention, however, contemplate moving the permutation and expansion logic operations out of the timing critical data path. By moving the expansion and permutation logic outside the timing critical data path, six bit slices can be custom-designed for combination with round keys and input into Sboxes. As noted above, Sboxes take six bit inputs and provide four bit outputs.

The permutation and expansion logic are removed from the timing critical data path by recognizing the characteristics of the permutation logic. DES specifies that the permutation logic move bits from certain input positions to certain output positions. For example, the four bit sequence on 1, 0, 1, 1 can be permuted by moving bit 1 to bit 3, bit 2 to bit 4, bit 3 to bit 2, and bit 4 to bit 1. The resulting bit sequence would be 1, 1, 1, 0. The inverse permutation would move bit 1 to bit 4, bit 2 to bit 3, bit 3 to bit 1, and bit 4 to bit 2. The inverse permutation applied to the resulting bit sequence 1, 1, 1, 0 would yield the original bit sequence 1, 0, 1, 1.

It can be recognized that taking the inverse permutation of the permutation of the bit sequence yields the original bit sequence. The relationship can be expressed as the following equations:

$$\text{bitsequence} = P^{-1}(P(\text{bitsequence})) \quad \text{Equation 1}$$

$$\text{bitsequence} = P(P^{-1}(\text{bitsequence})) \quad \text{Equation 2}$$

Equations 1 and 2 can be applied to the DES engine shown in FIG. 4. The L value at 463 is combined with an XOR the permutation of R value at 461 the yield T value at 465. The relationship can be shown with the following set of equations:

$$T = P(R) \text{ XOR } L$$

$$T = P(R) \text{ XOR } P(P^{-1}(L))$$

$$T = P(R \text{ XOR } P^{-1}(L)) \quad \text{Equation 3}$$

From the equation, it can be recognized that the R value at 461 does not need to be permuted until after it is combined with an XOR with the modified L value. Since the R value does not need to be permuted, the permutation logic can be moved out of the timing critical data path.

Figure 5:
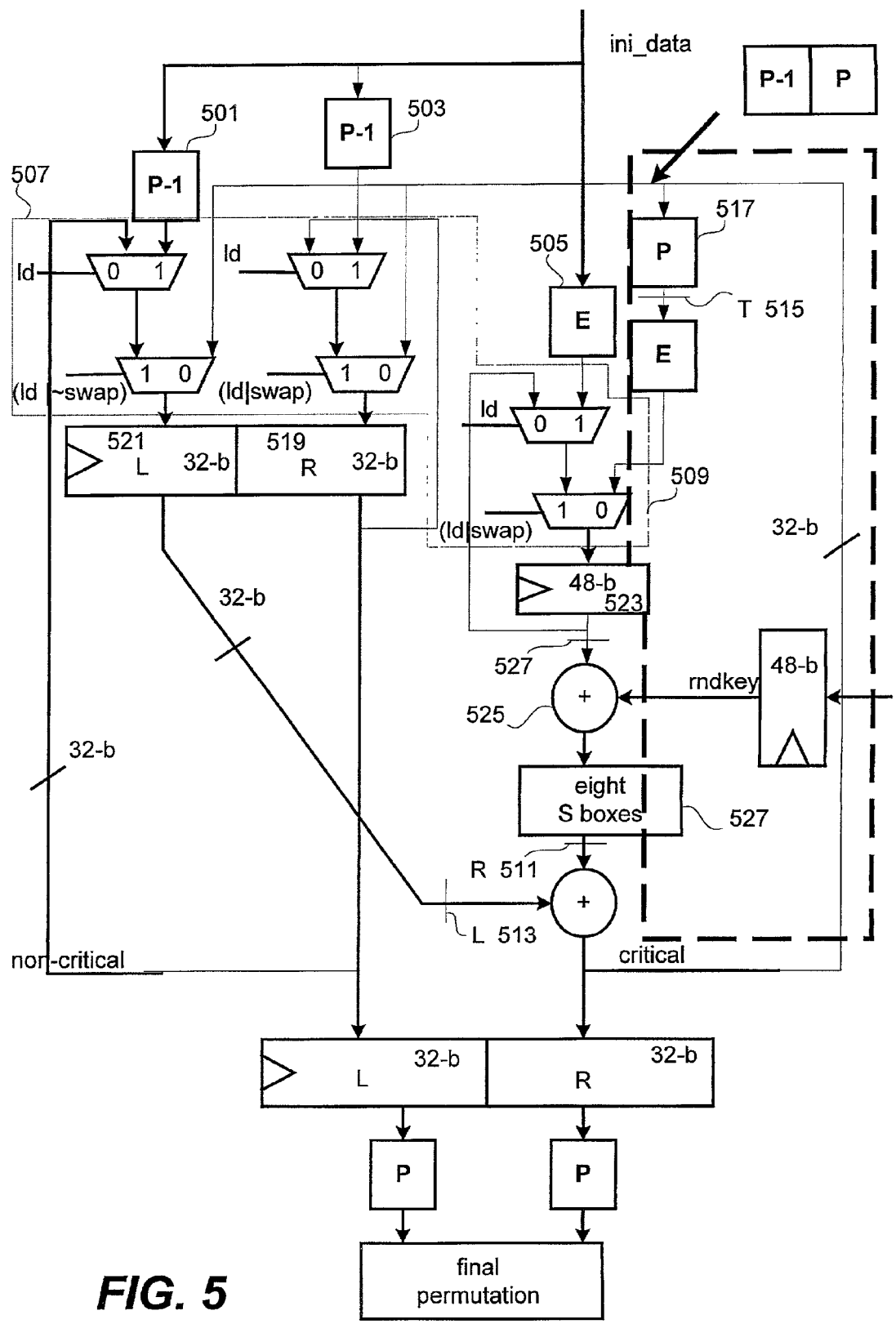
FIG. 5 is a diagrammatic representation of a DES engine that can be used for bit-sliced implementation in accordance with one embodiment of the present invention.

FIG. 5 is a diagrammatic representation of a DES engine in accordance with one embodiment of the present invention where the expansion and permutation logic are moved out of the timing critical data path. The T value at 515 corresponds to the T value at 465 in FIG. 4. That is, $T = P(R \text{ XOR } P^{-1}(L))$. More specifically, the L value at 513 is inverse permuted by inverse permutation logic 501. The R value at 511 is combined with an XOR with the inverse permutation of L value at 513. The result is then permuted by permutation logic 517 to yield T value at 515.

The data provided to the DES engine shown in FIG. 5 is split into a right and left half. The left half is provided to inverse permutation logic 501. The right half is provided to both inverse permutation logic 503 and expansion logic 505. The right half provided to inverse permutation logic 503 is passed to register 519 through two-level multiplexer 507. It should be noted that pulling the permutation and expansion logic out of the timing critical data path can be performed with or without using a two-level multiplexer.

The right half at register 519 is provided to register 521 for the next round of DES processing. The left half is provided to register 521 through two-level multiplexer 507. The left half or L value at 513 is combined with an XOR function with the R value at 511. The right half provided to expansion logic 505 is input into register 523 through two-level multiplexer 509. The value at 527 is then combined with an XOR with the round key and subsequently provided to Sbox stage 527. The result is R value at 511. The result is then fed back for the next round of DES processing. As noted above the two-level multiplexer determines whether to load the initial data, swap data, or not swap data. Since the permutation logic 517 and expansion logic 505 are both outside of the timing critical path, bit-sliced implementation can be used.

Figure 6:
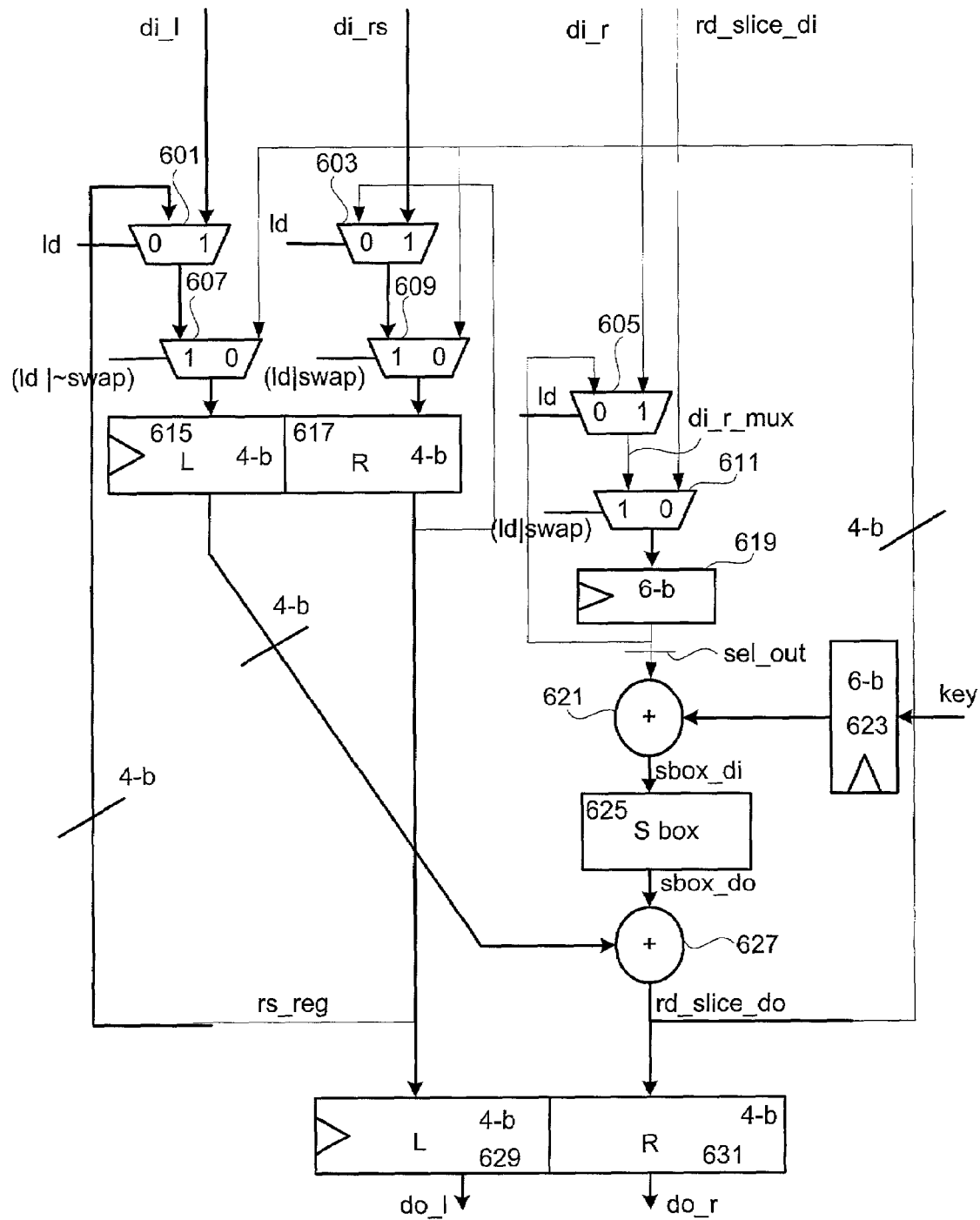
FIG. 6 is a diagrammatic representation of a bit-sliced implementation that can be used in FIG. 5 in accordance with one embodiment of the present invention.

FIG. 6 is a diagrammatic representation showing a bit-sliced implementation that can be used in accordance with one embodiment of the present invention. The value di_1 is one of the inputs to first level multiplexer 601. The value di_rs is one of the inputs to first level multiplexer 603. The value di_r is one of the inputs to first level multiplexer 605. The value rd_slice_di is one of the inputs to second level multiplexer 611. The value di_r_mux is the output value of multiplexer 605 and the other input to multiplexer 611. The value 1d is the control signal provided to the multiplexers to determine what input should be provided to output. The 1d value can be a sequence of ones or a sequence of zeros. The value sel_out is the output of the multiplexer 611 provided to register 619. The value sel_out is combined with an XOR function with a round key at 621 to yield value sbox_di. According to a preferred embodiment, di_r_mux, rd_slice_di, sel_out, and sbox_di are all six-bit sequences. After sbox_di is provided to Sbox 625, a four-bit sequence sbox_do is output. Sbox_do is combined with an XOR with the four bit value from register 615 to output rd_slice_do.

Bit-sliced implementation is possible because the permutation and expansion logic has been moved out of the data path corresponding to rd_slice_di and di_r. Using a six bit slice implementation, circuitry can be custom-designed to limit the effects of RC delay in the data path corresponding to rd_slice_di and di_r.

As will be appreciated by one of skill in the art, RC delay is not the only factor limiting throughput. The XOR function is also typically slow. The data path can be further optimized by performing the XOR function together with the functions of the two multiplexers 605 and 611. Although XOR functions are typically slow, OR functions can be implemented more efficiently. The XOR function can be decomposed into a single OR function used with other logic operations. The decomposition can be accomplished by understanding the characteristics of the data at various logic operations. The sel_out value in register 619 is either di_r_mux or rd_slice_di. The determination is made by control signal sel equivalent to (1d|swap). That is, the di_r_mux value is selected if it is round one. The rd_slice_di value is selected if it is not round one. The swap value is based on whether the current data is in transition before a 16 round DES operation in triple DES. The selection can be represented by the following equations, where ~ is the one's complement, & is a bitwise AND, ^ is an XOR, and | is a bitwise OR. The value sbox_di can be represented by the following equations:

sel_out=(sel & di_r_mux|~sel & rd_slice_di)    Equation 4

Where sel is 111111, di_r_mux is selected as sel_out. Where sel is 000000, rd_slice_di is selected as sel_out. The value sel_out XORed with the key yields sbox_di, shown by the following equation:

sbox_di=(sel & di_r_mux|~sel & rd_slice_di)^ key    Equation 5

An XOR function (a^b) can be decomposed as (a & ~b|~a & b). Equation 5 can be decomposed in the following manner:

sbox_di=(sel & di_r_mux|~sel & rd_slice_di)&
~key|~(sel & di_r_mux|~sel & rd_slice_di) &
key    Equation 5b sbox_di=(~sel & rd_slice_di & ~key)|(sel &
di_r_mux & ~key)|~(sel & di_r_mux) & ~(~sel
& rd_slice_di) & key    Equation 5c sbox_di=rd_slice_di & (~sel & ~key)|(~sel &
rd_slice_di|~(~sel & rd_slice_di)) & (sel &
di_r_mux & ~key)|(sel|~rd_slice_di) & (~sel| sbox_di=rd_slice_di & (~sel & ~key)|(~sel &
rd_slice_di) & (sel & di_r_mux & ~key)|
(sel|~rd_slice_di)&(sel & di_r_mux & ~key)|
(sel|~ sbox_di=rd_slice_di & (~sel & ~key)|(~sel &
rd_slice_di) & (sel & di_r_mux & ~key)|~rd_
slice_di & (sel & di_r_mux)^ key|sel & (sel The following term of Equation 5f is logically equivalent to 0: ~rd_slice_di & (sel & di_r_mux)^ key|sel & (sel & di_r_mux)^ key. Substituting in 0 Equation 6.

sbox_di=rd_slice_di & (~sel & ~key)|~rd_slice_di &
((sel & di_r_mux)^ key)|sel & ((sel &
di_r_mux)^ key)    Equation 6

By substituting the following values, equation 7 can be derived.

inp1=~sel & ~key inp2=((sel & di_r_mux)^ key)

inp3=sel & ((sel & di_r_mux)^ key)

sbox_di=rd_slice_di & inp1|~rd_slice_di & inp2|inp3    Equation 7

Figure 7:
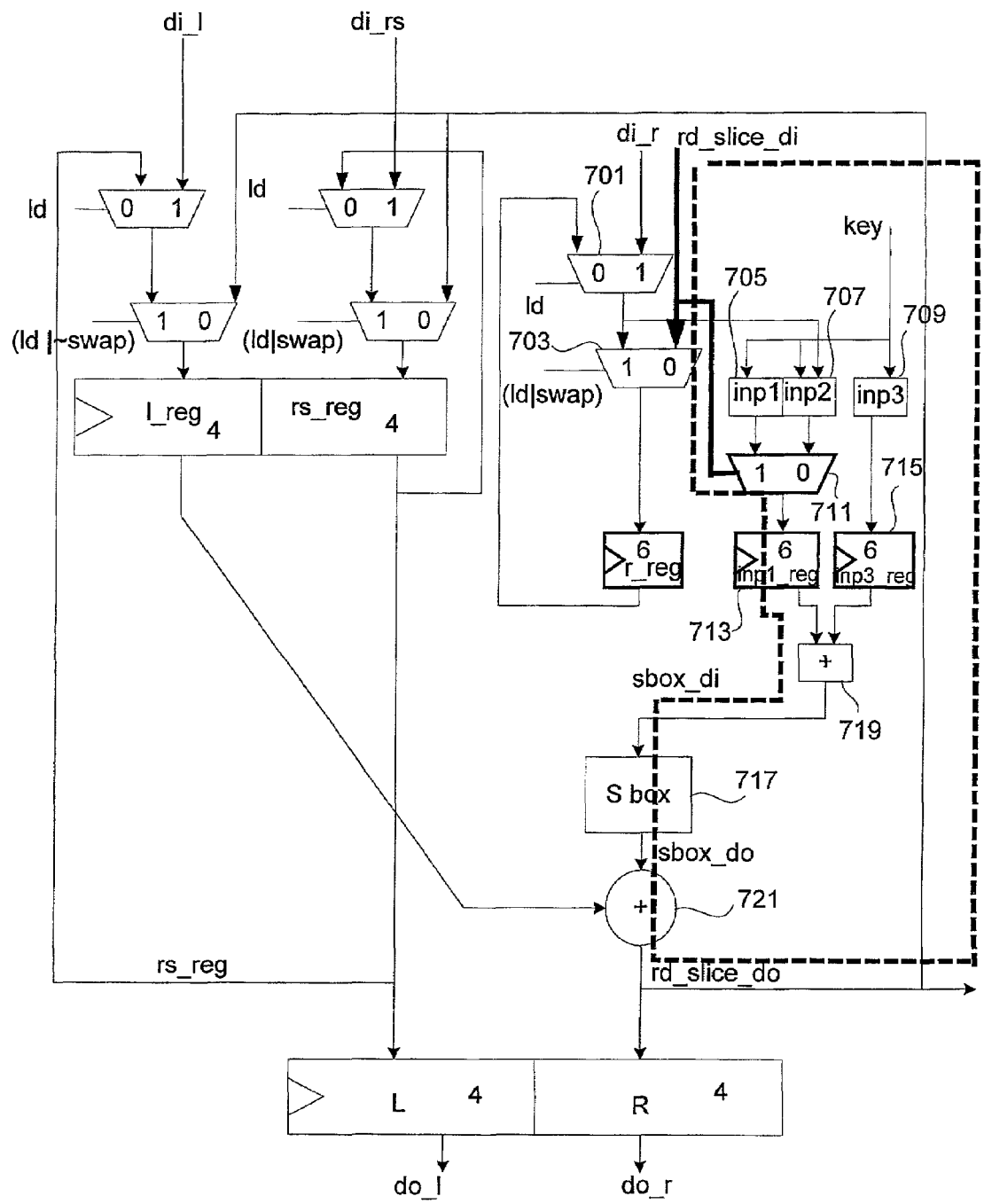
FIG. 7 is a diagrammatic representation of an optimized bit-sliced implementation in accordance with one embodiment of the present invention.

Equation 7 is represented in FIG. 7. FIG. 7 is a diagrammatic representation of one bit-sliced implementation in accordance with one embodiment of the present invention, where the XOR at 621 is decomposed into an OR and supplementary logic. It should be noted that the key here is provided to inp1 705, inp2 707, and inp3 709. Both inp1 705 and inp2 707 are inputs to second level multiplexer 711. The value rd_slice is the control signal selecting either inp1 705 or inp2 707 at second level multiplexer 711. The output of multiplexer 711 in register 713 is combined with an OR with the value in register 715. The output is sbox_di corresponding to the sbox_di value of FIG. 6. Providing sbox_di to Sbox 717 yields the same resulting sbox_do value that the implementation in FIG. 6 would yield. The resulting DES operations can be designed to yield the same cryptographic results.

As will be appreciated by one of skill in the art, other logic implementations can be used to improve cryptography processing performance in accordance with the present invention. In one implementation, a custom cell combines the OR gate with the registers 713 and 715. In another example, the XOR function 721 is decomposed into SBOX logic 717. According to various embodiments, a 500 MHz design is achieved for DES processing.

Another conventional performance limitation relates to key scheduling. In each round of DES processing, the key scheduler generates the round keys based on the original key based and the round counter. As the clock rate approaches 500 MHz, however, the key scheduling at each round becomes timing critical. For triple DES, one of three keys is pre-selected and a round key of one of the three keys is provided at each DES round. Pipelining is contemplated to allow the key to be provided in a high-speed DES environment. Key scheduling operations can be separated into different stages based on logical arrangements. In one embodiment, key scheduling is separated into operational stages that use approximately the same amount of time to perform their operations. In another embodiment, key scheduling separated into different stages for convenience.

In one specific embodiment, key scheduling is separated into four different stages. In the first stage, also called the determination stage, a shifting amount for performing the shift function is generated based on the round counter value. As noted above, the round keys are generated based on the original key and the round counter. In the second stage, also called the shift stage, the actual shift function is performed.

In the third stage, also called the stage, the round is passed from the key scheduler to the round logic. The round key is registered at register 623 in FIG. 6 or is input at inp1 705, inp2 707, and inp3 at 709. In the fourth stage also called the consumption stage, the round key is used in the corresponding DES round. As shown in table 1 below, the key scheduler takes advantage of pipeline processing.

TABLE 1

| D1 | S1 | P1 | C1 |    |
|----|----|----|----|----|
|    | D2 | S2 | P2 | C2 |
|    |    | D3 | S3 | P3 |

During the determination of the second key, a first key is shifted. During the shift of the second key, a first key is propagated and a third key is determined. During the consumption of the first key, a second key is propagated and a third key is shifted. According to various embodiments, pipelined design separates key scheduling into four stages. The pipeline design improves upon conventional techniques that describe generating the key and subsequently consuming the key.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of encryption algorithms and should not be restricted to the ones mentioned above. Therefore, the scope of the invention should be determined with reference to the appended claims.

What is claimed is:

1. A cryptography engine for performing cryptographic operations on an initial input data bit sequence, the initial input data bit sequence having a right portion and a left portion, the cryptographic engine comprising:

a key scheduler configured to provide keys for cryptographic operations;

two-level multiplexer circuitry including a first level having a first 2-1 multiplexer and a second 2-1 multiplexer, wherein the first 2-1 multiplexer receives the left portion of the initial input data bit sequence at a first input and a right portion of the input bit sequence for a previous cryptographic round at a second input and wherein the second 2-1 multiplexer receives the right portion of the initial input data bit sequence at a first input and the right portion of the input bit sequence for the previous cryptographic round at a second input, and a second level having a third 2-1 multiplexer and a fourth 2-1 multiplexer, wherein the third 2-1 multiplexer receives the output of the first 2-1 multiplexer at a first input and a right portion of an output bit sequence for a previous cryptographic round at a second input and wherein the fourth 2-1 multiplexer receives the output of the second 2-1 multiplexer at a first input and a right portion of the input bit sequence for the previous cryptographic round at a second input;

a first and a second expansion logic, wherein the first expansion logic is configured to expand a first bit sequence having a first size to an expanded first bit sequence having a second size greater than the first size, the first bit sequence corresponding to the right portion of the initial input data bit sequence;

permutation logic coupled to the second expansion logic, the permutation logic configured to alter a second bit sequence corresponding to the right portion of the output bit sequence for the previous cryptographic round;

a substitution box (SBox) configured to transform a third bit sequence to a fourth bit sequence, wherein the right portion of the output bit sequence for the current cryptographic round is the exclusive OR of the output of the third 2-1 multiplexer and the fourth bit sequence and the left portion of the output bit sequence for the current cryptographic round is the output of the fourth 2-1 multiplexer, and wherein the two-level multiplexer is configured to swap the left portion of the output bit sequence of a previous cryptographic round with the right portion of the output bit sequence of the previous cryptographic round.

2. The cryptography engine of claim 1, wherein the cryptography engine is a DES engine.

3. The cryptography engine of claim 1, wherein the first bit sequence is less than 32 bits.

4. The cryptography engine of claim 1, wherein the first bit sequence is four bits.

5. The cryptography engine of claim 1, wherein the key scheduler performs pipelined key scheduling logic.

6. The cryptography engine of claim 1, wherein the key scheduler comprises a plurality of stages.

7. The cryptography engine of claim 1, wherein the key scheduler comprises a determination stage.

8. The cryptography engine of claim 1, wherein the key scheduler comprises a shift stage.

9. The cryptography engine of claim 1, wherein the key scheduler comprises a propagation stage.

10. The cryptography engine of claim 1, wherein the key scheduler comprises a consumption stage.

11. The cryptography engine of claim 1, wherein the cryptographic engine is configured to perform triple-DES.

12. The cryptography engine of claim 11, wherein the two-level multiplexer is configured to select the right portion of a final round of a previous 16-round DES operation as the right portion of the input bit sequence for a first round of a subsequent 16-round DES operation and to select the left potion of the final round of the previous 16-round DES operation as the left portion of the input bit sequence for the first round of the subsequent 16-round DES operation.

13. The cryptography engine of claim 1, wherein the two-level multiplexer is configured to select the right portion of the initial input data bit sequence as the, right portion of the input bit sequence for an initial round of a multiple round DES operation and the left portion of the initial input data bit sequence as the left portion of the input bit sequence for the initial round of the multiple round DES operation.

14. The cryptography engine of claim 1, wherein the right portion of the initial input bit sequence is an inverse permutation of a first portion of an input data block and the left portion of the initial input bit sequence is an inverse permutation of a second portion of the input data block.

15. The cryptography engine of claim 1, further including:

a 3-1 multiplexer, wherein the 3-1 multiplexer is configured to receive an initialization vector at a first input, a static vector at a second input, and an output of a cryptographic operation having a plurality of cryptographic rounds; and exclusive OR circuitry coupled to the 3-1 multiplexer, wherein the exclusive OR circuitry is configured to generate the initial input bit sequence as the exclusive OR of an input data block and an output of the 3-1 multiplexer.

16. An integrated circuit layout associated with a cryptography engine for performing cryptographic operations on an initial input data bit sequence, the initial input data bit sequence having a right portion and a left portion, the cryptographic engine comprising:

a key scheduler configured to provide keys for cryptographic operations;

two-level multiplexer circuitry including a first level having a first 2-1 multiplexer and a second 2-1 multiplexer, wherein the first 2-1 multiplexer receives the left portion of the initial input data bit sequence at a first input and a right portion of the input bit sequence for a previous cryptographic round at a second input and wherein the second 2-1 multiplexer receives the right portion of the initial input data bit sequence at a first input and the right portion of the input bit sequence for the previous cryptographic round at a second input, and a second level having a third 2-1 multiplexer and a fourth 2-1 multiplexer, wherein the third 2-1 multiplexer receives the output of the first 2-1 multiplexer at a first input and a right portion of an output bit sequence for a previous cryptographic round at a second input and wherein the fourth 2-1 multiplexer receives the output of the second 2-1 multiplexer at a first input and a right portion of the input bit sequence for the previous cryptographic round at a second input;

a first and a second expansion logic, wherein the first expansion logic is configured to expand a first bit sequence having a first size to an expanded first bit sequence having a second size greater than the first size, the first bit sequence corresponding to the right portion of the initial input data bit sequence;

permutation logic coupled to the second expansion logic, the permutation logic configured to alter a second bit sequence corresponding to the right portion of the output bit sequence for the previous cryptographic round;

a substitution box (SBox) configured to transform a third bit sequence to a fourth bit sequence, wherein the right portion of the output bit sequence for the current cryptographic round is the exclusive OR of the output of the third 2-1 multiplexer and the fourth bit sequence and the left portion of the output bit sequence for the current cryptographic round is the output of the fourth 2-1 multiplexer, and wherein the two-level multiplexer is configured to swap the left portion of the output bit sequence of a previous cryptographic round with the right portion of the output bit sequence of the previous cryptographic round.

17. The integrated circuit layout of claim 16, wherein the cryptography engine is a DES engine.

18. The integrated circuit layout of claim 16, wherein the first bit sequence is less than 32 bits.

19. The integrated circuit layout of claim 16, wherein the first bit sequence is four bits.

20. The integrated circuit layout of claim 16, wherein the key scheduler performs pipelined key scheduling logic.

21. The integrated circuit layout of claim 16, wherein the key scheduler comprises a plurality of stages.

22. The integrated circuit layout of claim 16, wherein the key scheduler comprises a determination stage.

23. The integrated circuit layout of claim 16, wherein the key scheduler comprises a shift stage.

24. The integrated circuit layout of claim 16, wherein the key scheduler comprises a propagation stage.

25. The integrated circuit layout of claim 16, wherein the key scheduler comprises a consumption stage.

26. The integrated circuit layout of claim 16, wherein the cryptographic engine is configured to perform triple-DES.

27. The integrated circuit layout of claim 26, wherein the two-level multiplexer is configured to select the right portion of a final round of a previous 16-round DES operation as the right portion of the input bit sequence for a first round of a subsequent 16-round DES operation and to select the left potion of the final round of the previous 16-round DES operation as the left portion of the input bit sequence for the first round of the subsequent 16-round DES operation.

28. The integrated circuit layout of claim 16, wherein the two-level multiplexer is configured to select the right portion of the initial input data bit sequence as the right portion of the input bit sequence for an initial round of a multiple round DES operation and the left portion of the initial input data bit sequence as the left portion of the input bit sequence for the initial round of the multiple round DES operation.

29. The integrated circuit layout of claim 16 wherein the right portion of the initial input bit sequence is an inverse permutation of a first portion of an input data block and the left portion of the initial input bit sequence is an inverse permutation of a second portion of the input data block.

30. The integrated circuit layout of claim 16, further including:

a 3-1 multiplexer, wherein the 3-1 multiplexer is configured to receive an initialization vector at a first input, a static vector at a second input, and an output of a cryptographic operation having a plurality of cryptographic rounds; and exclusive OR circuitry coupled to the 3-1 multiplexer, wherein the exclusive OR circuitry is configured to generate the initial input bit sequence as the exclusive OR of an input data block and an output of the 3-1 multiplexer.

* * * * *